United States Statutory Invention Registration [19]

[11] Reg. Number: H841

Lanteigne [43] Published: Nov. 6, 1990

[54] SINGLE LASER EXPOSURE AND MONITORING OF HOLOGRAMS

[75] Inventor: David J. Lanteigne, Huntsville, Ala.

[73] Assignee: The United States of America as represented by the Secretary of the Army, Washington, D.C.

[21] Appl. No.: 386,323

[22] Filed: Jul. 28, 1989

[51] Int. Cl.[5] ..... G03H 1/10

[52] U.S. Cl. ..... 350/3.67; 350/3.83

[58] Field of Search ..... 350/3.6, 3.61, 3.63, 350/3.67, 3.83

[56] References Cited

U.S. PATENT DOCUMENTS

| | | | |
|---|---|---|---|
| 4,125,314 | 11/1978 | Haskell et al. | 350/3.6 |
| 4,252,400 | 2/1981 | Bernal et al. | 350/3.63 |
| 4,458,978 | 7/1984 | Arns et al. | 350/3.67 |
| 4,602,849 | 7/1986 | Nicholson | 350/3.83 |
| 4,738,498 | 4/1988 | Baba | 350/3.63 |

OTHER PUBLICATIONS

K. Booth, Photopolymer Material for Holography; Mar. 1975 pp. 593–601. Applied Optics vol. 14. No. 3.

W. S. Colburn et al., Volume Hologram Formation in Photopolymer Materials; Jul. 1971 pp. 1636–1641. Applied Optics.

Bruce L. Booth, Photopolymer Laser Recording Materials, Winter 1977, Journal of Applied Photographic Engineering vol. 3, No. 1 pp. 24–30.

Christoph Brauchle and Donald M. Burlard, Holographic Methods for the Investigation of Photochemical and Photophysical Properties of Molecules; Argeur Chem. Int. Engl 22 (1983) pp. 582–598.

G. C. Bjorklund et al.; A Holographic Technique for Investigating Photochemical Reactions; J. Chem. Phys 73(9) 1 Nov. 1980 pp. 4321–4328.

D. M. Burland and Chr. Brauchle; The Use of Holography To Investigate Complex.

Photochemical Reations, J. Chem. Phys. 76 (9), 1 May 1982 pp. 4502–4512.

Yoshiaki Nakano and Kunio Tada, In Situ Monitoring Technique for Fabrication of High-Quality Diffraction Gratings, Optics Letters Jan. 1988/vol. 13 No. 1, pp. 7–9.

*Primary Examiner*—Thomas H. Tarcza
*Assistant Examiner*—Linda J. Wallace
*Attorney, Agent, or Firm*—James T. Deaton; Fred M. Bush

[57] ABSTRACT

A system in which the light of a single laser is used to both expose a hologram and to simultaneously measure the formation of the hologram in the recording material.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SINGLE LASER EXPOSURE AND MONITORING OF HOLOGRAMS

DEDICATORY CLAUSE

The invention described herein may be manufactured, used, or licensed by or for the Government for Governmental purposes without the payment to me of any royalties thereon.

BACKGROUND OF THE INVENTION

In the past, various known techniques for the measurement of hologram formation has been used, but these techniques are not suitable for normal silver-halide based photographic films since light forms a latent image in these films that is not revealed until development. However, photopolymer films and other recording media begin to form a hologram almost immediately upon exposure and consequently, it is possible to record a hologram with a laser of one color and to view its formation simultaneously with a second laser of another color. The color of the second laser or probe, is chosen so as to have no physical or chemical effect upon the recording medium. The two laser technique for photopolymer holograms is discussed in prior art publications. Similar techniques are also used in chemistry in which a holographic exposure illuminates a mixture, and the formation of a transient or permanent hologram gives a measure of chemical reactions. The two-laser technique can also be applied here as well as a single laser technique. These chemical applications are discussed in the prior art publications also.

Even in light of the prior art there is a need for a device that can be used in the study and characterization of holographic recording materials and films that utilize a single laser source.

Therefore, it is an object of this invention to provide a device that utilizes a single laser source in the study and characterization of holographic recording materials and films and a device that can be used in the control of holographic exposure systems to cause an optimum exposure to be produced.

Other advantages and objects of this invention will be obvious to those who are skilled in this art.

SUMMARY OF THE INVENTION

In accordance with this invention, a system for exposing a holographic recording medium and for simultaneously measuring the formation of the hologram in the recording medium is provided and includes a single laser source that is split by a beam splitter into an object beam and a reference beam that are used to expose a holographic recording medium. Shutters are placed in the paths of the object beam and the reference beam before the holographic recording medium and the opening and closing of the shutters are controlled as desired depending upon the exposure desired of the holographic recording medium. A photodiode is mounted beyond the holographic recording medium and in the path of the reference beam. The photodiode is utilized to measure the formation of the hologram with the detected formation of the hologram being used in data acquisition to produce signals that can be used with the shutter control for control of the shutters in the required or desired development of the hologram.

DESCRIPTION OF THE PREFERRED EMBODIMENT

Figure 1:
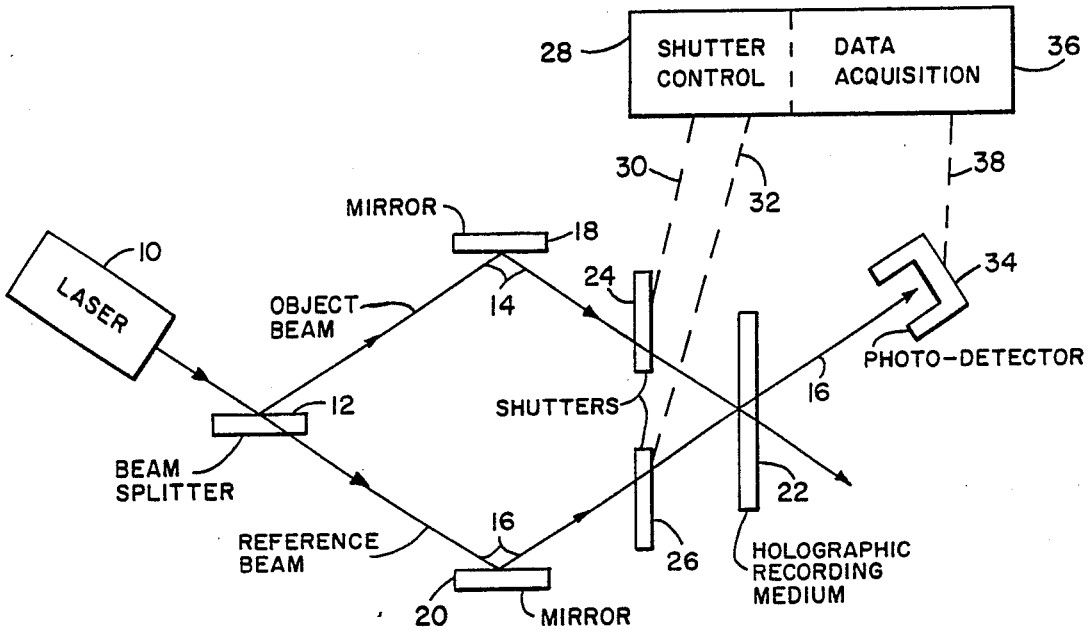
FIG. 1 is a schematic illustration of the system in accordance with this invention.

Referring now to the drawing, a laser source 10 is utilized to illuminate a beam splitter 12 which splits the beam into an object beam 14 and a reference beam 16. Mirrors 18 and 20 or other suitable optical devices are placed so as to cause beams 14 and 16 to be deflected and meet at a front surface of holographic recording medium 22. Beams 14 and 16 jointly form an interference pattern and a record of this interference pattern impressed on recording medium 22 produces a hologram. The arrangement described thus far is known most commonly as the Leith-Upatnieks type of holograms. To this arrangement shutter 24 is placed in the path of object beam 14 and shutter 26 is placed in the path of reference beam 16 as illustrated. Shutters 24 and 26 are placed in the beam paths such that they can block the light of each beam before it impinges on holographic recording material 22. Shutters 24 and 26 can be electro-mechanical vane shutters, rotating beam choppers, electro-optic shutters, or any other device that can be used to alternately block and pass light. Object beam shutter 24 and reference beam shutter 26 are controlled by shutter control 28 through connecting means 30 and 32 to open and close shutters 24 and 26 as desired for exposing holographic recording medium 22. Shutter control device 28 is used to issue the desired signals to cause shutters 24 and 26 to open and close at specific times. A photodetector 34 of conventional type structure is placed in the path of reference beam 16 beyond holographic recording material 22 as illustrated. A data acquisition device 36 is synchronized with shutter control device 28 to measure through link 38 the light incident on photodetector 34 at specific times, and to store this data. Photodetector 34 is connected by link 38 to data acquisition device 36 in a conventional manner. Shutter control device 28 and data acquisition device 36 can be utilized as general purpose computers, special purpose computers, or other logic devices with appropriate clocks and analog to digital converters. Also, if desired shutter control device 28 and data acquisition device 36 can be incorporated into one computer or control device.

In operation, the operation cycle is based on the fact that when a hologram is present in hologram recording medium 22, and the hologram is illuminated by the object beam 14, some portion of the object beam light is diffracted by the hologram to form a replica of the original reference beam. The diffracted light travels from the hologram in the path of the reference beam and falls upon photodetector 34. The diffracted light is measured and stored in data acquisition device 36. The fraction of the object beam light that is diffracted into the reference beam is called the diffraction efficiency. This efficiency is an important measure of the quality of the hologram.

Figure 2:
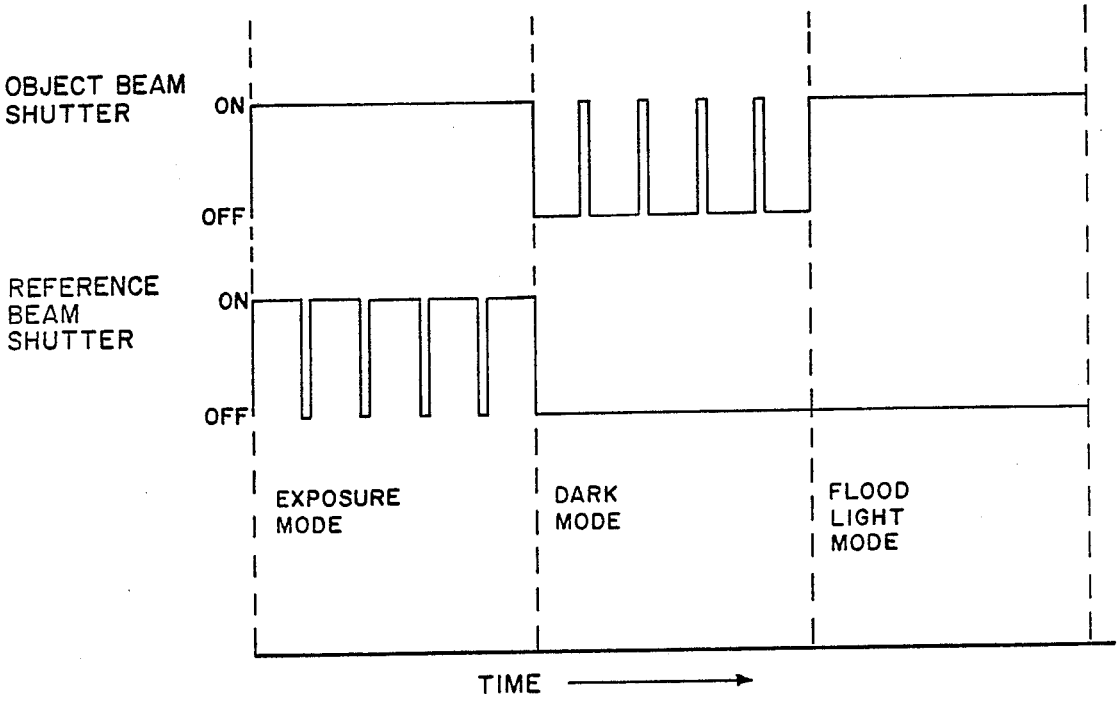
FIG. 2 is an illustration of the position of the shutters in the three different modes of operation.

Applicant's device has three different specific modes of operation that are identified as exposure mode, dark mode, and flood light mode. The shutter actions for each of these modes is shown on the attached shutter time diagram as illustrated in FIG. 2. The specific mode used depends upon the nature of the particular holographic recording medium used. Exposure is necessary in all cases, and various recording media call for processing by heat, chemicals, or other means in the dark. Some media require post exposure illumination by a bright, uniform flood light.

In the exposure mode, object beam shutter 24 is in the open position continuously and reference beam shutter 26 Is open most of the time as illustrated in FIG. 2. At predetermined regular intervals, reference beam shutter 26 is closed briefly for a short time and then reopened as illustrated in FIG. 2. During the brief closure of reference beam shutter 26, the only light that reaches photodetector 34 is the light diffracted from object beam 14. Data acquisition device 36 is synchronized with shutter control 28 to know when shutter 26 is closed so that the intensity of the diffracted light can be measured and stored in data acquisition device 36. The total fraction of time that reference beam shutter 26 is closed during exposure (i.e., the duty cycle) should be small in comparison to the on time and the length of each closure of shutter 26 should be small relative to the reaction time of holographic recording medium 22.

In the dark mode, reference beam shutter 26 is closed continuously. Object beam shutter 24 is opened briefly at regular intervals as illustrated in FIG. 2 and data acquisition device 36 is synchronized with shutter 24 to measure the light diffracted from object beam 24. The duty cycle, when the object shutter 24 is opened, must be small in comparison to when shutter 24 is closed so that the total amount of light falling on the hologram during this dark mode is negligible.

In the flood light mode, reference beam shutter 26 is closed continuously and object beam shutter 24 is open continuously. Data acquisition device 36 measures the diffracted light level at photodetector 34 at regular intervals. In this mode, some auxiliary light source can be used to flood the hologram, in which case photodetector 34 must be shielded from this auxiliary light in order to give a true reading of the diffracted laser light.

The duration of each mode of operation can be a predetermined interval or the duration can be ended when the measured diffraction efficiency of the hologram reaches a predetermined level as measured by photodetector 34 with data acquisition device 36.

As will be appreciated, this device utilizes the light of a single laser to expose a hologram and to simultaneously measure the formation of the hologram in the recording material. This invention is applicable to the use of holographic recording materials that begin to form holograms almost immediately upon exposure and including but not limited to photopolymers, thermoplastics, and photochromic materials. The invention further allows the measure of the hologram diffraction efficiency during the processing steps that are necessary after exposure such as chemical developing. The exposure and processing can be controlled with feedback from these measurements.

I claim:

1. A system for producing a hologram comprising; a laser light source, beam splitter means for splitting the laser light source into an object beam and a reference beam, mirror reflecting means for reflecting the object beam and the reference beam onto a holographic recording medium, shutters mounted in the path of the object beam and the reference beam before they are directed onto the holographic recording medium, a photodetector mounted beyond the holographic recording medium and in the path of the reference beam, and control means for controlling the opening and closing of the shutters and for recording data from said photodetector to monitor the amount of developing of the holographic recording medium.

2. A system as set forth in claim 1, wherein said control means is a computer.

3. A system as set forth in claim 1, wherein said control means includes a shutter control that is a computer and a data acquisition device that is a computer to enable the shutters in the object beam path and the reference beam path to be opened and closed in predetermined sequences to expose the holographic recording medium as desired.

* * * * *